United States Patent
Xue et al.

(10) Patent No.: US 11,636,666 B2
(45) Date of Patent: Apr. 25, 2023

(54) METHOD AND APPARATUS FOR IDENTIFYING KEY POINT LOCATIONS IN IMAGE, AND MEDIUM

(71) Applicant: BEIJING BAIDU NETCOM SCIENCE AND TECHNOLOGY CO., LTD., Beijing (CN)

(72) Inventors: Xuetong Xue, Beijing (CN); Hui Ren, Beijing (CN); Min Yang, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 14 days.

(21) Appl. No.: 17/212,635

(22) Filed: Mar. 25, 2021

(65) Prior Publication Data

US 2021/0279500 A1 Sep. 9, 2021

(30) Foreign Application Priority Data

May 29, 2020 (CN) .......................... 202010479505.6

(51) Int. Cl.
*G06V 10/46* (2022.01)
*G06V 10/50* (2022.01)

(52) U.S. Cl.
CPC ............ *G06V 10/462* (2022.01); *G06V 10/50* (2022.01)

(58) Field of Classification Search
CPC ...... G06V 10/462; G06V 10/50; G06V 10/82; G06K 9/6271; G06K 9/6256; G06K 9/6267
See application file for complete search history.

(56) References Cited

U.S. PATENT DOCUMENTS

| 11,275,931 | B2* | 3/2022 | Zhang | ............... G06K 9/6257 |
| 2018/0096224 | A1 | 4/2018 | Fua et al. | |
| 2019/0205618 | A1* | 7/2019 | Jiang | ................ G06V 10/25 |
| 2019/0279045 | A1* | 9/2019 | Li | ................ G06K 9/6267 |
| 2019/0279338 | A1 | 9/2019 | Bergen et al. | |
| 2019/0303677 | A1* | 10/2019 | Choutas | ............... G06V 40/20 |
| 2019/0392202 | A1* | 12/2019 | Hong | ............... G06V 10/449 |

(Continued)

FOREIGN PATENT DOCUMENTS

| CN | 104616316 A | 5/2015 |
| CN | 104835175 A | 8/2015 |
| CN | 110378264 A | 10/2019 |

OTHER PUBLICATIONS

Extended European Search Report issued in corresponding EP Application No. 21163342.5 dated Sep. 6, 2021 (9 pages).

(Continued)

*Primary Examiner* — Aaron W Carter
(74) *Attorney, Agent, or Firm* — Osha Bergman Watanabe & Burton LLP

(57) ABSTRACT

The present disclosure provides a method for identifying key point locations in an image. The method includes: obtaining an image to be detected, and obtaining a feature map and a saliency map of the image to be detected; generating a score response map of the image to be detected based on the feature map of the image to be detected; obtaining a first key point location of a key point on the score response map; obtaining a second key point location of the key point mapped on the image to be detected based on the first key point location; and correcting the second key point location based on the saliency map.

17 Claims, 10 Drawing Sheets

(56) References Cited

U.S. PATENT DOCUMENTS

| | | | | |
|---|---|---|---|---|
| 2020/0082635 | A1* | 3/2020 | Zhu | G06N 3/08 |
| 2020/0250462 | A1* | 8/2020 | Yang | G06V 40/10 |
| 2021/0241015 | A1* | 8/2021 | Song | G06K 9/6271 |
| 2021/0279500 | A1* | 9/2021 | Xue | G06V 10/462 |
| 2021/0406525 | A1* | 12/2021 | Fan | G06N 3/0454 |
| 2022/0076000 | A1* | 3/2022 | Yang | G06T 3/0006 |
| 2022/0122292 | A1* | 4/2022 | Zhu | G06N 3/08 |
| 2022/0157047 | A1* | 5/2022 | Truong | G06V 10/764 |

OTHER PUBLICATIONS

Benbihi, Assia et al. "ELF: Embedded Localisation of Features in pre-trained CNN" arxiv.org, Cornell University Library, 201 Olin Library Cornell University Ithaca, NY 14853, Jul. 7, 2019 (Jul. 7, 2019), XP081438957 (16 pages).

Widya, Aji Resindra et al. "Structure-from-Motion using Dense CNN Features with Keypoint Relocalization" arxiv.org, Cornell University Library, 201 Olin Library Cornell University Ithaca, NY 14853, May 10, 2018 (May 10, 2018), XP080876762 (8 pages).

Office Action issued in corresponding CN Application No. 202010479505.6 with English translation dated Jan. 20, 2023 (66 pages).

Yang Ting "Study on Selection of Focus of Attention and Optimal Trajectory Planning of Gaze Shifts for Modeling Visual Attention Mechanisms" China Excellent Master's Degree Thesis Full-text Database (Information Technology Series), No. 8, 2012 (71 pages).

Deng Yaping et al. "Infrared dim target detection based on visual attention mechanism" Journal of Huazhong University of Science and Technology, vol. 43, Oct. 2015 (5 pages).

Tang Can "A survey of image feature detection and matching methods" Journal of Nanjing University of Information Science and Technology (Natural Science Edition) No. 12 vol. 3 pp. 261-273 (13 pages).

Wu Liting "Three-dimensional free-form object recognition based on contour curve and local surface patches in range images" Journal of image and graphics, the first vol. 17, Issue 2, pp. 269-278 (10 pages).

J.J. Bonaiuto et al. "Combining attention and recognition for rapid scene analysis" Proceedings of the 2005 IEEE Computer Society Conference on Computer Vision and Pattern Recognition (9 pages).

Vitaly Pimenov "Fast Image Matching with Visual Attention and SURF Descriptors" Computer Science 2009 (8 pages).

* cited by examiner

METHOD AND APPARATUS FOR IDENTIFYING KEY POINT LOCATIONS IN IMAGE, AND MEDIUM

CROSS-REFERENCE TO RELATED APPLICATION

The present application is based upon and claims priority to Chinese Patent Application No. 202010479505.6, filed on May 29, 2020, the entirety contents of which are incorporated herein by reference.

TECHNICAL FIELD

The present disclosure relates to a field of image processing technologies, and more particularly, a field of computer vision technologies.

BACKGROUND

In the field of image processing technologies, key points or feature points of an image generally refer to representative or characteristic pixels in the image, which express image meanings or characteristics of objects in the image in a similar or same invariant form in other similar images containing the same scene or objects. The image information of the key points is represented as image feature descriptors, which usually represent the image for image analysis and recognition. Therefore, how to accurately find the key points in an image is of great significance for image processing, and how to accurately find the key points in an image has become one of the research hotspots in the field of computer vision technologies.

SUMMARY

The embodiments of this disclosure provide a method for identifying key point locations in an image, an apparatus for identifying key point locations in an image, an electronic device and a medium.

Embodiments of the present disclosure provide a method for identifying key point locations in an image. The method includes: obtaining an image to be detected, and obtaining a feature map and a saliency map of the image to be detected; generating a score response map of the image to be detected based on the feature map of the image to be detected; obtaining a first key point location of a key point on the score response map; obtaining a second key point location of the key point mapped on the image to be detected based on the first key point location; and correcting the second key point location based on the saliency map.

Embodiments of the present disclosure provide an apparatus for identifying key point locations in an image. The apparatus includes: one or more processors; a memory storing instructions executable by the one or more processors; in which the one or more processors are configured to: obtain an image to be detected, and to obtain a feature map and a saliency map of the image to be detected; generate a score response map of the image to be detected based on the feature map of the image to be detected; obtain a first key point location of a key point on the score response map; obtain a second key point location of the key point mapped on the image to be detected based on the first key point location; correct the second key point location based on the saliency map.

Embodiments of the present disclosure provide a storage medium having a computer program stored thereon that, when executed by a processor, the method for identifying key point locations in an image according to embodiments of the present disclosure is implemented. The method includes: obtaining an image to be detected, and obtaining a feature map and a saliency map of the image to be detected; generating a score response map of the image to be detected based on the feature map of the image to be detected; obtaining a first key point location of a key point on the score response map; obtaining a second key point location of the key point mapped on the image to be detected based on the first key point location; and correcting the second key point location based on the saliency map.

It should be understood that the content described in this section is not intended to identify key or important features of the embodiments of the present disclosure, nor is it intended to limit the scope of the present disclosure. Additional features of the present disclosure will be easily understood by the following description.

BRIEF DESCRIPTION OF THE DRAWINGS

The drawings are used to better understand the solution and do not constitute a limitation to the disclosure, in which.

DETAILED DESCRIPTION

The following describes the exemplary embodiments of the present disclosure with reference to the accompanying drawings, which includes various details of the embodiments of the present disclosure to facilitate understanding, which shall be considered merely exemplary. Therefore, those of ordinary skill in the art should recognize that various changes and modifications can be made to the embodiments described herein without departing from the scope and spirit of the present disclosure. For clarity and conciseness, descriptions of well-known functions and structures are omitted in the following description.

A method for identifying key point locations in an image, an apparatus for identifying key point locations in an image, an electronic device and a medium are described as follows.

In image processing, image information of key points is usually determined as image feature descriptors to represent images for analysis and recognition.

In common key point extraction methods based on a convolutional neural network, when performing key point extraction, first, the input image is extracted to a feature map representation having a reduced resolution, then a series of points are selected on the feature map and projected back to the original input image. These points correspond to a series of local areas on the original input image respectively, and a center point of the local area on the original input image is taken as the final key point.

However, since the key points reflect the most representative locations on the image, rather than fixed locations, and corner locations on a general image are suitable as key points, and the center location of the local area is not necessarily a corner point. Therefore, in the related art, the method of determining a center point of the local area as the key point is unreasonable, and it is difficult to select an optimal point of the local area, resulting in low accuracy of the selected key points.

To solve the above problems, the present disclosure provides a method for identifying key, point locations in an image, by acquiring the saliency map corresponding to the image to be detected, the saliency map is used to correct the key point location determined according to the feature map, thereby avoiding the defect of fixing the center location of the local area on the image as the key point of the image, and ensuring that the revised key point location is more representative than the center position of the local area, so that the accuracy of key point selection is improved.

Figure 1:
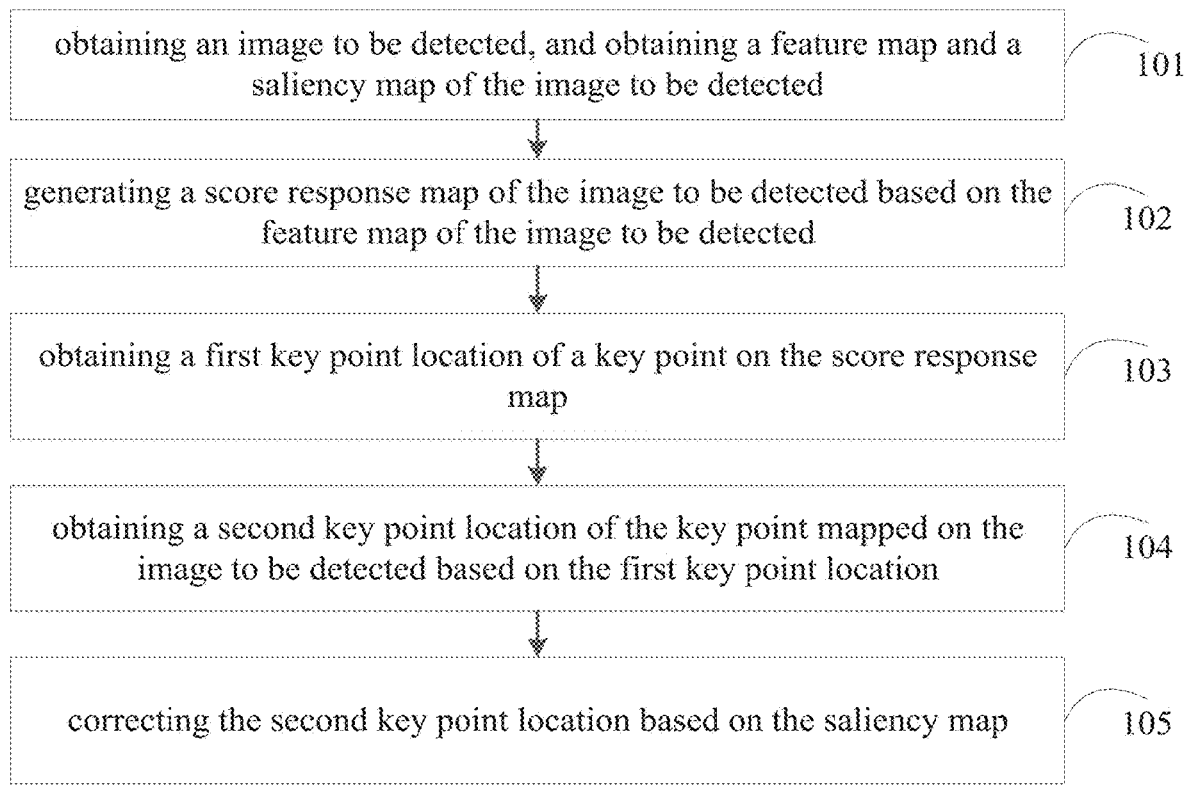
FIG. 1 is a flowchart of a method for identifying key point locations in an image according to Embodiment 1 of the present disclosure.

FIG. 1 is a flowchart of a method for identifying key point locations in an image according to Embodiment 1 of the present disclosure. This method is executed by an apparatus for identifying key point locations in an image according to the present disclosure, or by the electronic device in the present disclosure, where the electronic device may be a server, or a terminal device such as a desktop computer or a notebook computer. In the present disclosure, the method for identifying key point locations in the image is executed by the apparatus for identifying key point locations in the image.

As illustrated in FIG. 1, the method for identifying key point locations in an image includes the following steps.

At step 101, an image to be detected is obtained, and a feature map and a saliency map of the image to be detected are obtained.

The image to be detected may be any image that requires key point recognition. The image to be detected may contain at least one object. For example, the image to be detected may include any object such as vehicles, buildings, animals and plants. Through the method for identifying the key point locations in the image according to the present disclosure, it is possible to identify key points representing objects contained in the image to be detected.

In this embodiment, an image is obtained from a published image data set as the image to be detected, where the published image data set may be, for example, ImageNet data set, PASCAL VOC data set and Label me data set; or, it is also possible to obtain an image from a local image library as the image to be detected; alternatively, an image may also be taken as the image to be detected. The present disclosure does not limit the method for obtaining the image to be detected.

After acquiring the image to be detected, a feature map corresponding to the image to be detected is acquired.

For example, a pre-trained neural network model may be used to perform a feature extraction operation on the image to be detected to obtain a feature map corresponding to the image to be detected. The neural network model may be a Visual Geometry Group Network (VGGNet), AlexNet, a Residual Network (ResNet) network, or neural network models in other forms that can be used for image feature extraction.

When training the above neural network model, firstly, a large-scale data set such as ImageNet is adopted to pre-train convolutional neural network models such as VGGNet, ResNet, and AlexNet, and cross-entropy loss function is adopted during training to obtain a classification model for classifying images, Structure From Motion (SFM) is used to automatically mark key points on a Megadepth dataset and fine-tune the pre-trained classification model. When fine-tuning the pre-trained classification model, after loading the pre-trained classification model, the new data with labeled key points are used for new training on the Megadepth data set, and Triplet Margin Ranking Loss function is adopted in the process of fine-tuning the classification model. The loss function is a common loss function for metric learning. The triple means that the image input to the network consists of three images to form a triple. The three images are divided into a reference image (anchor), a positive sample (positive) and a negative sample (negative). The reference image and the positive sample together generate a simple triple, and the reference image and the negative sample generate a difficult triple. Through network optimization, the distance between the simple triple is getting closer and the distance between the difficult triple is getting farther and farther. That is, the pre-trained classification model is fine-tuned based on the Triplet Margin Ranking Loss function. The loss function adjusts the network to minimize a distance corresponding to the correct point and maximize a distance corresponding to the wrong point according to input paired images and corresponding key point annotation relations. The fine-tuned classification model is used for feature extraction of the image to be detected to obtain a feature map of the image to be detected.

For example, the image to be detected is input into the pre-trained neural network model for feature extraction, and the output feature map of a certain pooling layer in the neural network model is used as the feature map of the image to be detected.

Since pixel-level annotation is very subtle, different manual annotations may introduce inconsistencies in the correspondence relation, which may cause errors, and as the image data set expands, the ratio of images to be annotated increases. The more the ratio of images to be annotated increases, the longer the time cost of manual labeling. In the embodiments of the present disclosure, when the neural network model is trained, key points are automatically marked on the data set through SFM, which reduces manual intervention, saves labeling manpower and time cost, and improves the accuracy of key point labeling.

Further, according to the feature map of the image to be detected, the saliency map of the image to be detected is obtained.

In deep learning, gradient backpropagation is usually performed by backpropagation algorithm. Therefore, in this embodiment, when acquiring the saliency map of the image to be detected, the feature map of the image to be detected is used as input, the gradient of the feature map relative to the image to be detected is calculated based on the standard backpropagation algorithm, and a gradient map with the same resolution as the image to be detected is obtained. The gradient map includes the gradient value of each point on the image to be detected. The gradient map is used as the saliency map of the image to be detected.

Alternatively, the points in the gradient map are filtered, and the points in the gradient map that meet the conditions are used to form the saliency map. In detail, after the gradient map is obtained based on the backpropagation algorithm, the gradient values on the gradient map can be screened based on an adaptive threshold, and the points whose gradient value reaches the adaptive threshold are used to form the saliency map. The adaptive threshold is calculated using the image entropy segmentation method. When calculating the adaptive threshold, for the gradient map, 256 gray levels are used as 256 segmentation thresholds, and the probability density functions under each segmentation threshold are calculated respectively, and then the foreground and background pixels under each segmentation threshold are calculated according to each probability density function. Then the maximum entropy is found, and the segmentation threshold corresponding to the maximum entropy is determined as the final threshold, that is, the adaptive threshold. By comparing each gradient value on the gradient map with the determined adaptive threshold, the gradient values less than the adaptive threshold are removed, the gradient values greater than or equal to the adaptive threshold are retained, and the points corresponding to the retained gradient values are used to form the saliency map of the image to be detected.

It should be noted that the image entropy segmentation method is adopted to calculate the adaptive threshold, which is a relatively mature technology, so the calculation process is only briefly described in this embodiment, and no detailed description is provided.

Figure 2:
FIG. 2(a) is a sample graph of an image to be detected.
FIG. 2(b) is a sample diagram of a saliency map corresponding to the image to be detected shown in FIG. 2(a).
Figure 2:
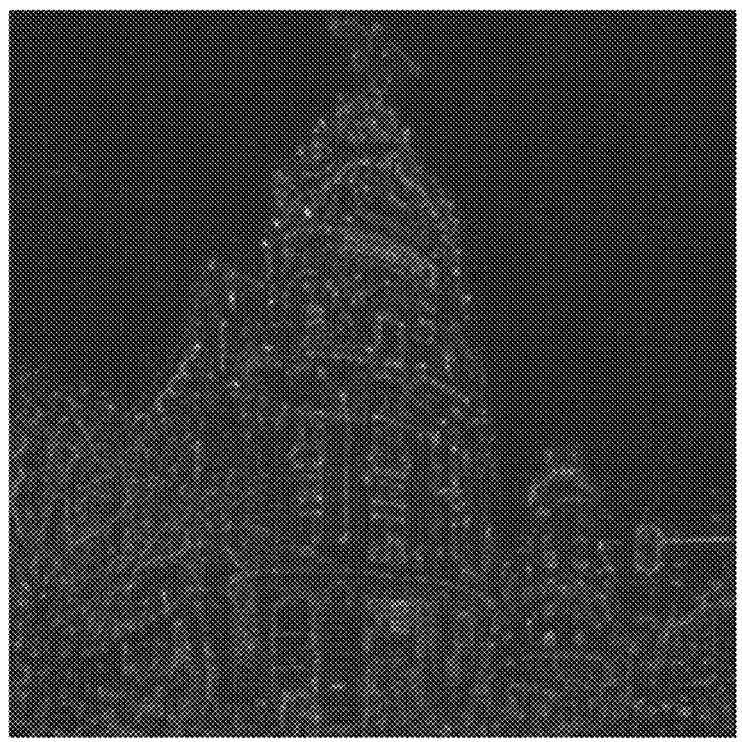

FIG. 2(a) is a sample graph of an image to be detected. FIG. 2(b) is an example diagram of a saliency map corresponding to the image to be detected shown in FIG. 2(a). Combining FIG. 2(a) and FIG. 2(b), it can be seen that points with higher brightness in the saliency map of FIG. 2(b) correspond to edge locations and detail locations of objects in FIG. 2(a), that is, the high gradient values in the saliency map correspond to the representative locations of the edges and details of the objects on the image to be detected.

Since the content of the saliency map reflects gradient changes of the edges of all objects on the image to be detected, high gradient values correspond to representative locations of the edges and details of the objects on the image to be detected, Therefore, the gradient values in the gradient map that are smaller than the adaptive threshold are eliminated, so that the points on the saliency map obtained only reflect the edge locations and detail locations of the objects on the image to be detected, which is beneficial to subsequent correction of the key point locations according to the saliency map and to reduce the amount of subsequent data processing.

At step 102, a score response map of the image to be detected is generated based on the feature map of the image to be detected.

In this embodiment, for each feature point on the image to be detected, different feature points near the feature point and feature points at the same position on other channels are combined to calculate the response score of the feature point. After calculating the response score of each feature point on the feature map, the score response map of the image to be detected is obtained.

In the score response map, each response score refers to a pixel intensity (numerical intensity) of the feature point on the feature map. The high value corresponds to high response, and the high response reflects the object locations on the feature map or the image to be detected.

As a possible implementation, when calculating the response score of the feature point, a maximum pixel value is determined according to the pixel values of the feature point and several other feature points around the feature point, and the values of the feature point on each channel are obtained, the maximum value is selected, and then the response score of the feature point is calculated according to the maximum value on the channel and the largest pixel values.

At step 103, a first key point location of a key point on the score response map is obtained. In the score response map, the larger the response score, the more it reflects the object locations on the feature map. Therefore, in this embodiment, each response score on the score response map is compared with a preset threshold, the location of the feature point with the response score greater than the threshold in the score response map is determined as the first key point location.

At step 104, a second key point location of the key point mapped on the image to be detected is determined based on the first key point location.

In this embodiment, when the key points are mapped on the image to be detected, mapping is performed according to a resolution relation between the feature map and the image to be detected to determine the second key point location of the key point on the image to be detected.

For example, the resolution of the feature map is compared with the resolution of the image to be detected. If the resolution of the feature map and the resolution of the image to be detected are the same, the location same as the first key point location is found on the image to be detected, and this position is the second key point location of the key point mapped on the image to be detected.

For example, when the resolution of the feature map is different from the resolution of the image to be detected, a second key point location of the key point on the image to be detected may be determined according to the ratio relation between the two resolutions and the first key point location.

At step 105, the second key point location is corrected based on the saliency map.

In this embodiment, after determining the second key point location of the key point on the image to be detected, the acquired saliency map of the image to be detected is used to correct the second key point location.

For example, when performing key point location correction, for the second key point location determined on the image to be detected, the second key point location is adjusted according to the saliency value in the same area on the saliency map, and the second key point location is adjusted to the location with the highest significant value in the area.

Since the high saliency-value on the saliency map corresponds to the representative locations of the edges and details of the objects on the image to be detected, the saliency map is used to correct the second key point location on the image to be detected to make the corrected location more representative.

With the method for identifying key point locations in an image, an image to be detected is obtained, a feature map and a saliency map of the image to be detected are also obtained. A score response map of the image to be detected is generated based on the feature map of the image to be detected. A first key point location of a key point on the score response map is obtained. A second key point location of the key point mapped on the image to be detected is obtained based on the first key point location, and the second key point location is corrected based on the saliency map. Therefore, by acquiring the saliency map corresponding to the image to be detected, the saliency map is used to correct the key point location determined according to the feature map, thereby avoiding the defect of fixing the center location of the local area on the image as the key point of the image, and ensuring that the revised key point location is more representative than the center position of the local area, so that the accuracy of key point selection is improved.

Figure 3:
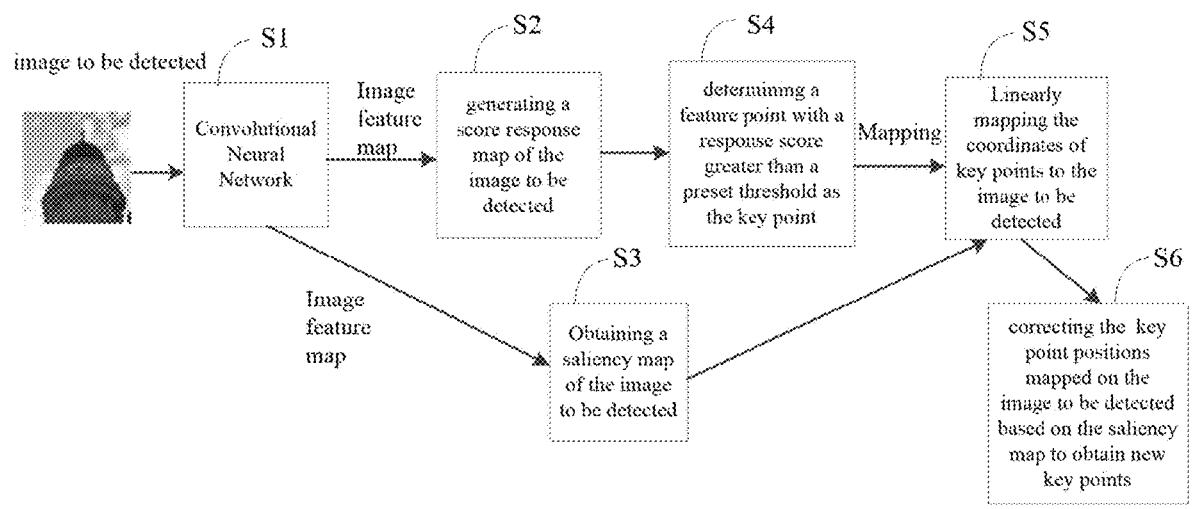
FIG. 3 is a sample diagram of an image key point extraction process according to a specific embodiment of the present disclosure.

FIG. 3 is a sample diagram of an image key point extraction process according to a specific embodiment of the present disclosure. As illustrated in FIG. 3, for an image to be detected, step S1 is executed first, the convolutional neural network is used to perform feature extraction on the image to be detected to obtain an image feature map, then step S2 is executed to determine the score response map of the image to be detected according to the feature map, and step S3 is executed to determine the saliency map of the image to be detected according to the feature map. Next, step S4 is executed to select the high-response locations in the score response map as the key points on the feature map. Afterwards, step S5 is executed to linearly map coordinates of the key points on the image to be detected, and then step S6 is executed to correct the key point locations mapped on the image to be detected based on the saliency map to obtain new key points, and the new key points are the key points that is finally recognized.

In order to more clearly illustrate the specific implementation process of generating the score response map of the image to be detected according to the feature map of the image to be detected in the above embodiments, a detailed description is given below with reference to FIG. 4.

Figure 4:
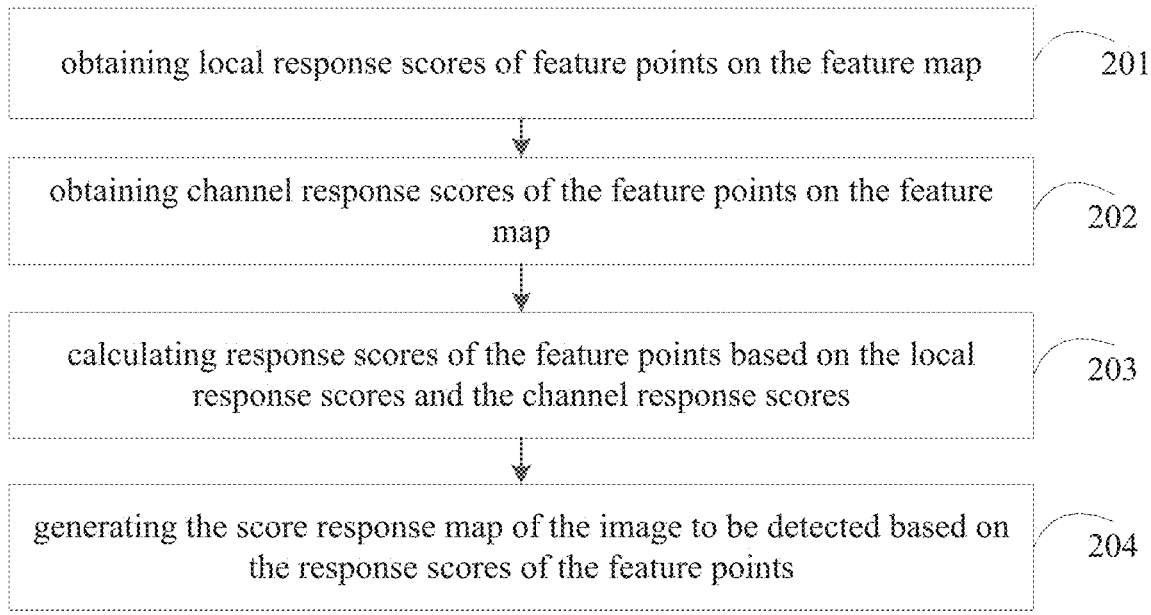
FIG. 4 is a flowchart of a method for identifying key point locations in an image according to Embodiment 2 of the present disclosure.

FIG. 4 is a flowchart of a method for identifying key point locations in an image according to Embodiment 2 of the present disclosure. As illustrated in FIG. 4, on the basis of FIG. 1, step 102 includes the following steps.

At step 201, local response scores of feature points on the feature map are obtained.

In this embodiment, for each feature point on the feature map, the local response score of each feature point is obtained.

In a possible implementation of the embodiments of the present disclosure, when obtaining the local response score of each feature point, for the $i^{th}$ feature point (i is a positive integer, the value range of i is from 1 to n, n represents the total number of feature points in the feature map), a plurality of feature points adjacent to the feature point are obtained, for example, 8 adjacent feature points around the $i^{th}$ feature point are obtained, and the feature value of the $i^{th}$ feature point and the feature values of the plurality of adjacent feature points are obtained, the feature value is represented by pixel intensity, and then a local response score of the feature point is generated based on the feature value of the $i^{th}$ feature point and the feature values of the plurality of adjacent feature points.

For example, the feature value of the feature point is compared with the feature values of the plurality of adjacent feature points, and the largest feature value is selected as the local response score of the feature point.

Finally, the feature points in the feature map are traversed sequentially to obtain the local response scores of the feature points.

By obtaining the plurality of adjacent feature points of the feature point, and obtaining the feature value of the feature point and the feature values of the plurality of adjacent feature points, the local response score of the feature point is generated according to the feature value of the feature point and the feature values of the plurality of adjacent feature points, so that when determining the local response score of each feature point, not only the feature point, but also other feature points around the feature point are considered, which is beneficial to improve the calculation accuracy of the local response score, and to improve the accuracy of the obtained score response graph.

At step 202, channel response scores of the feature points on the feature map are obtained.

In this embodiment, for each feature point on the feature map, in addition to obtaining the local response score of the feature point, the channel response score of the feature point is also obtained.

In a possible implementation of the embodiments of the present disclosure, when obtaining the channel response score of each feature point, for the $i^{th}$ feature point, a plurality of feature values of the $i^{th}$ feature point on a plurality of channels are obtained, and then the channel response score of the $i^{th}$ feature point is generated according to the plurality of feature values of the feature point on a plurality of channels.

Assuming that the size of the feature map is w*h*c, w and h are length and width respectively, and c is a number of channels, then for each feature point on the feature map, the feature values of the feature point on c channels are obtained respectively, and c feature values are compared to obtain the largest feature value, and the largest feature value is determined as the channel response score of the feature point.

Finally, the feature points on the feature map are traversed sequentially to obtain the channel response scores of the feature points.

By obtaining the feature values of the $i^{th}$ feature point on the plurality of channels, the channel response score of the $i^{th}$ feature point is generated according to the plurality of feature values of the feature point on the plurality of channels. When determining the channel response scores of the feature points, the feature values of the feature points on different channels are considered, which is beneficial to improve the accuracy of the obtained score response map.

It should be noted that the execution order of step 201 and step 202 could be executed simultaneously or sequentially. The embodiments of the present disclosure only execute step 202 after step 201 to explain this disclosure, which is not limited in the present disclosure.

At step 203, response scores of the feature points are calculated based on the local response scores and the channel response scores.

In this embodiment, after obtaining the local response score and channel response score of each feature point on the feature map, the response score of each feature point is calculated according to the local response score and channel response score of each feature point.

For example, when calculating the response score of each feature point, a response score of each feature point is obtained by multiplying a local response score of the feature point with a channel response score of the feature point. Therefore, the local response score and the channel response score are used to obtain the response score of the feature point, so that the calculated response score not only considers other feature points around the feature point, but also considers the channel where the feature point is located, which is helpful to improve the accuracy of the obtained score response graph.

For example, when calculating the response score of each feature point, according to the influence degree of the local response score and channel response score on the response score of the feature point, corresponding weights are assigned to the local response score and channel response score in advance. Furthermore, a weighted sum calculation is performed on the local response score and the channel response score to obtain the response score of the feature point.

At step 204, the score response map of the image to be detected is generated based on the response scores of the feature points.

In this embodiment, after the response score of each feature point on the feature map is obtained, the score response map of the image to be detected is generated according to the response scores of the feature points.

In the method for identifying key point locations in an image of this embodiment, the local response score of each feature point on the feature map is obtained, and the channel response score of each feature point on the feature map is obtained, response scores of the feature points are obtained based on the local response scores and the channel response scores, to generate the score response map of the image to be detected based on the response scores of the feature points. Therefore, the obtained response score of each feature point in the score response graph not only considers other feature points around the feature point, but also considers the channel where the feature point is located, which is beneficial to improve the accuracy of the obtained score response graph.

In a possible implementation of the embodiment of the present disclosure, in order to more clearly describe the specific implementation process of obtaining the first key point location of the key point on the score response graph in the above embodiments, a detailed description is given below in combination with FIG. 5.

Figure 5:
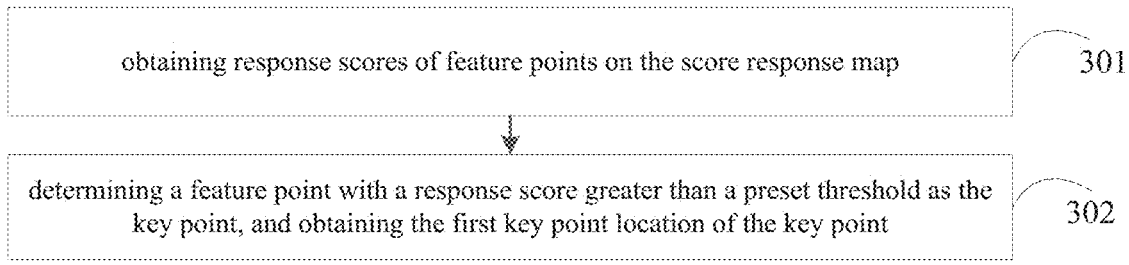
FIG. 5 is a flowchart of a method for identifying key point locations in an image according to Embodiment 3 of the present disclosure.

FIG. 5 is a flowchart of a method for identifying key point locations in an image according to Embodiment 3 of the present disclosure. As illustrated in FIG. 5, on the basis of FIG. 1, step 103 includes the following steps.

At step 301, response scores of feature points on the score response map are obtained.

Since the score response map of the image to be detected is generated by calculating the response score of each feature point on the feature map, each feature point on the score response map corresponds to the feature point at the same position on the feature map. Therefore, in this embodiment, the response score of each feature point is obtained on the score response map of the image to be detected.

At step 302, a feature point with a response score greater than a preset threshold is determined as the key point, and the first key point location of the key point is obtained.

The preset threshold value may be manually preset, or may also be obtained through adaptive calculation, for example, a threshold value may be calculated based on a common threshold value segmentation method.

In this embodiment, after the response score of each feature point on the score response graph is obtained, each response score is compared with the preset threshold, if the response score of a certain feature point is greater than the preset threshold, the feature point is determined as the key point, and the feature point location is taken as the first key point location. Through the above method, the first key point location corresponding to all the key points on the score response graph is determined.

The first key point location is represented by the position coordinate of the corresponding key point on the score response graph, which could be recorded as (Pi, Pj), Pi represents a number of pixel rows where the key point is located on the score response graph, Pj represents a number of pixel columns where the key point is located on the score response map.

According to the method for identifying key point locations in an image according to the embodiments of the present disclosure, response scores of feature points on the score response map are obtained. A feature point with a response score greater than a preset threshold is determined as the key point, and the first key point location of the key point is obtained. Therefore, the selection of key points on the score response map is realized, which lays the foundation for subsequent determination of the key points on the image to be detected.

Since the feature map of the image is obtained by feature extraction on the original image, the resolution of the feature map is usually smaller than or equal to the resolution of the original image. In a possible implementation of the embodiments of the present disclosure, the resolution of the feature map is smaller than the resolution of the image to be detected. In this way, the number of feature points on the feature map is reduced, and one feature point on the feature map is used to represent an area region on the image to be detected, thereby reducing the amount of data for subsequent calculation.

Further, in a possible implementation of the embodiments of the present disclosure, when determining the second key point location of the key point mapped on the image to be detected, mapping is performed according to the resolution of the feature map and the resolution of the image to be detected, which is described in detail below with reference to FIG. 6.

Figure 6:
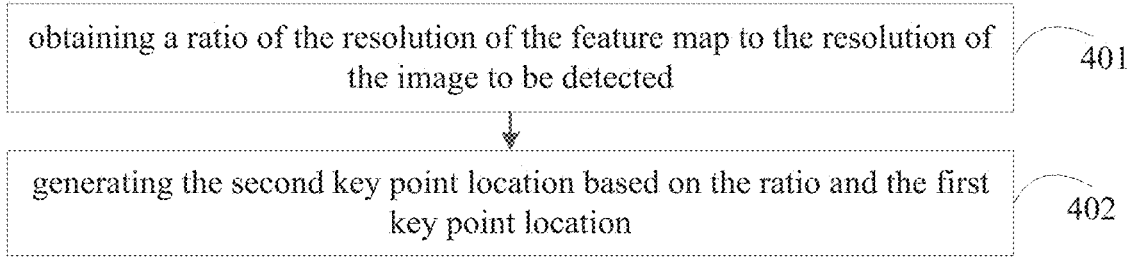
FIG. 6 is a flowchart of a method for identifying key point locations in an image according to Embodiment 4 of the present disclosure.

FIG. 6 is a flowchart of a method for identifying key point locations in an image according to Embodiment 4 of the present disclosure. As illustrated in FIG. 6, on the basis of FIG. 1, step 104 includes the following steps.

At step 401, a ratio of the resolution of the feature map to the resolution of the image to be detected is obtained.

For an image, the resolution of the image refers to the amount of information stored in the image, which is the number of pixels contained in each inch of the image. Generally, the resolution is expressed as the number of pixels in each direction, such as 640*480. For a known image, the resolution of the image is also known. Therefore, in this embodiment, the resolution of the feature map and the resolution of the image to be detected are obtained separately, and the resolution ratio of the resolution of the feature map to the resolution of the image to be detected is calculated.

For example, assuming that the resolution of the feature map is 160*120 and the resolution of the image to be detected is 1280*960, the ratio of the resolution of the feature map to the resolution of the image to be detected is 1/8.

At step 402, the second key point location is generated based on the ratio and the first key point location.

Generally, the size of the feature map is generally a fixed scale reduction value of the original image size, such as ⅛ of the original image, and the feature points on the score response map correspond to the feature points on the feature map. The first key point location of the key point on the score response map is the key point location of the key point on the feature map. Therefore, in this embodiment, the second key point location is generated based on the ratio and the first key point location. When determining the second key point location, the product of the ratio of the first key point location and the resolution is calculated, and the obtained result is used as the key point to map the second key point position on the image to be detected.

For example, assuming that the ratio of the resolution of the feature map to the resolution of the image to be detected is ⅛, and the first key point location of the key point is (Pi, Pj), then the second key point location of the same key point mapping on the image to be detected is (8*Pi, 8*Pj).

In the method for identifying key point locations in an image of this embodiment, the ratio of the resolution of the feature map to the resolution of the image to be detected is obtained, and the second key point location is generated based on the ratio and the first key point location. Therefore, the mapping of the key points on the feature map on the original image is realized, the initial recognition of the key points is realized, and conditions are provided for the subsequent correction of the key point location of the initial recognition.

In a possible implementation of the embodiments of the present disclosure, in order to more clearly describe the specific implementation process of correcting the second key point location according to the saliency map in the above embodiments, a detailed description is given below with reference to FIG. 7.

Figure 7:
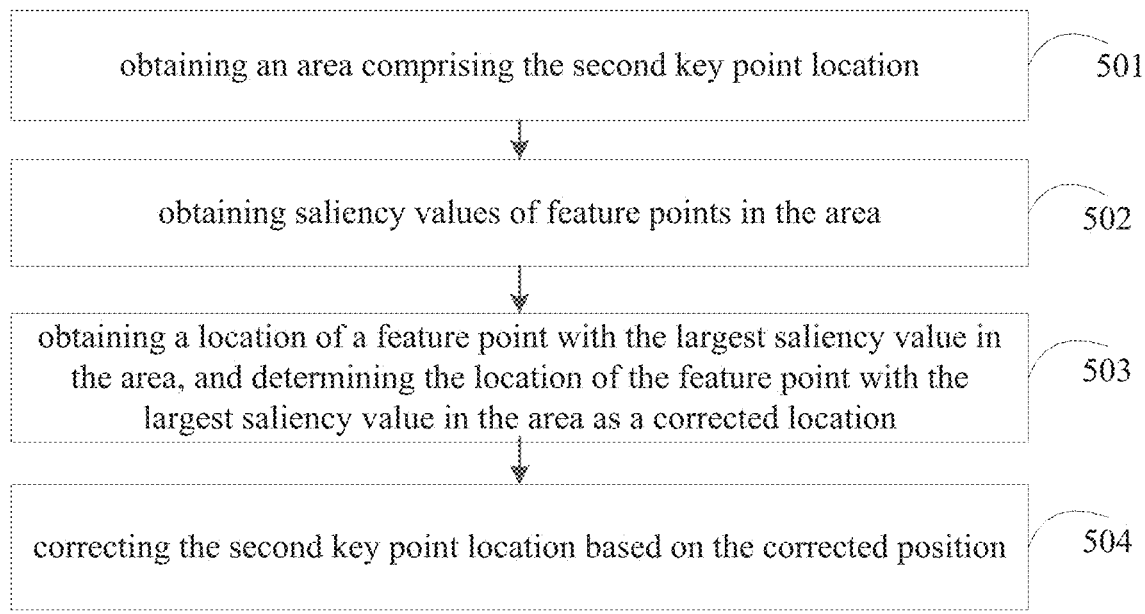
FIG. 7 is a flowchart of a method for identifying key point locations in an image according to Embodiment 5 of the present disclosure.

FIG. 7 is a flowchart of a method for identifying key point locations in an image according to Embodiment 5 of the present disclosure. As illustrated in FIG. 7, on the basis of FIG. 1, step 105 includes the following steps.

At step 501, an area comprising the second key point location is obtained.

For example, a range within a preset distance around the second key point location may be divided into an area, and this area may be taken as the area where the second key point location is located, and the area is acquired.

For another example, the area surrounded by a preset number of points that are closest to the second key point location may be used as the area where the second key point location is located, and the area is acquired.

At step 502, saliency values of feature points in the area are obtained.

At step 503, a location of a feature point with the largest saliency value in the area is obtained, and the location of the feature point with the largest saliency value in the area is determined as a corrected location.

At step 504, the second key point location is corrected based on the corrected position.

In this embodiment, the saliency value of each feature point in the area where the second key point location is located is obtained from the saliency map corresponding to the image to be detected, and the saliency value of each feature point in the same area is compared to obtain the location of the feature point with the largest saliency value in the same area, and the location of the feature point with the largest saliency value in the area where the second key point is located is determined as the correction location of the key point. Furthermore, the second key point location is corrected to the determined correction location, thereby realizing the correction of the key point location on the image to be detected, and improving the accuracy of key point recognition.

In the method for identifying key point locations in an image of this embodiment, the area where the second key point location is located is obtained, and the salient value of each feature point in the area where the second key point location is located, and the location of the feature point with the largest saliency value in the area is obtained, and the location of the feature point with the largest saliency value in the area is corrected to the corrected position. Thus, the correction of the key point location on the image to be detected is realized, and the accuracy of key point recognition is improved.

According to the embodiments, the present disclosure provides an apparatus for identifying key point locations in an image.

Figure 8:
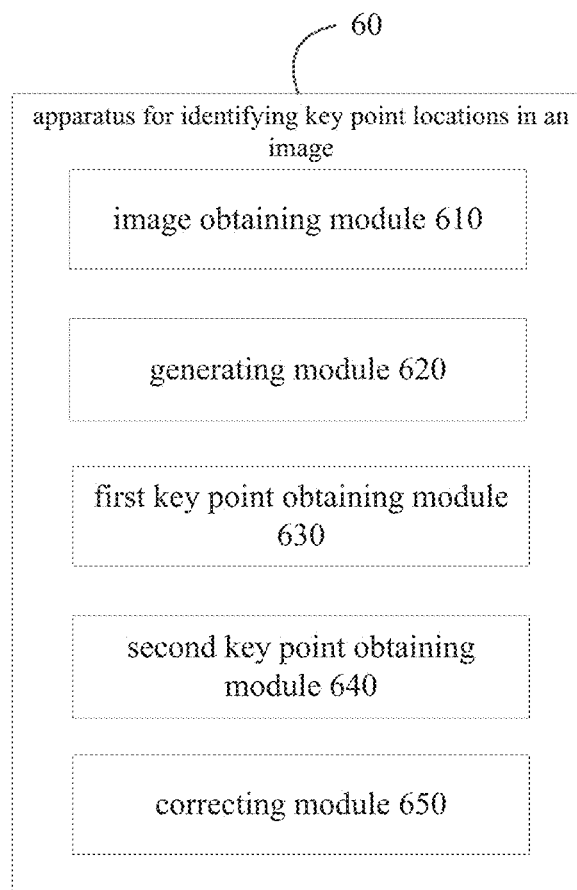
FIG. 8 is a schematic diagram of an apparatus for identifying, key point locations in an image according to Embodiment 6 of the present disclosure.

FIG. 8 is a schematic diagram of an apparatus for identifying key point locations in an image according to Embodiment 6 of the present disclosure. As illustrated in FIG. 8, the apparatus 60 for identifying key point locations in an image includes: an image obtaining module 610, a generating module 620, a first key point obtaining module 630, a second key point obtaining module 640 and a correcting module 650.

The image obtaining module 610 is configured to obtain an image to be detected, and to obtain a feature map and a saliency map of the image to be detected.

The generating module 620 is configured to generate a score response map of the image to be detected based on the feature map of the image to be detected.

The first key point obtaining module 630 is configured to obtain a first key point location of a key point on the score response map.

The second key point obtaining module 640 is configured to obtain a second key point location of the key point mapped on the image to be detected based on the first key point location.

The correcting module 650 is configured to correct the second key point location based on the saliency map.

Figure 9:
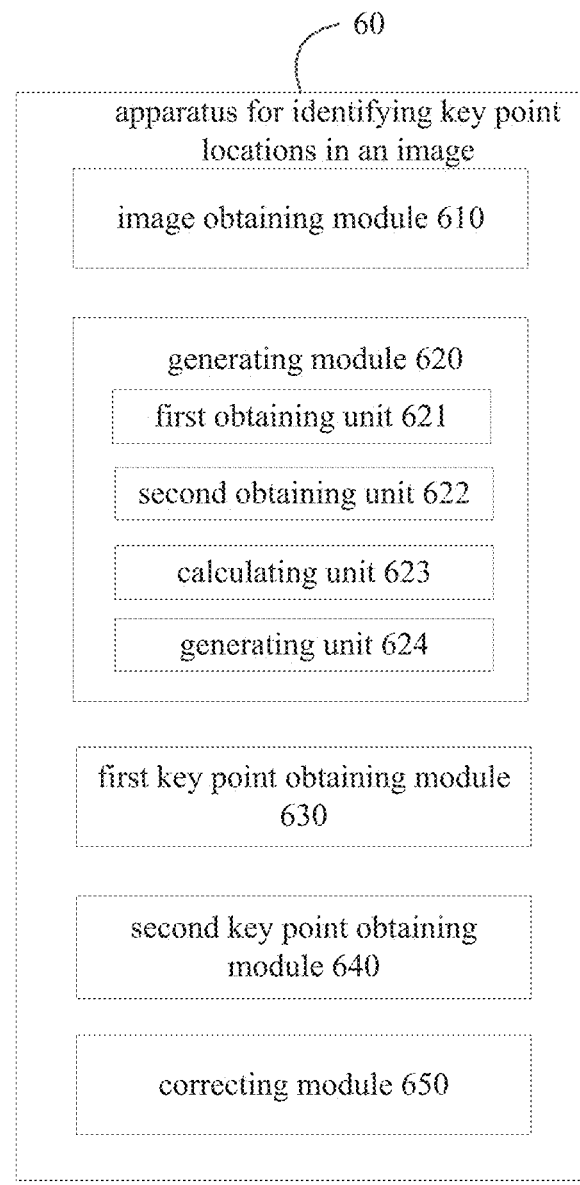
FIG. 9 is a schematic diagram of an apparatus for identifying key point locations in an image according to Embodiment 7 of the present disclosure.

In a possible implementation of the embodiments of the present disclosure, as illustrated in FIG. 9, on the basis of FIG. 8, the generating module 620 includes: a first obtaining unit 621, configured to obtain local response scores of feature points on the feature map.

As a possible implementation, the first obtaining unit 621 is configured to obtain a plurality of feature points adjacent to an $i^{th}$ feature point, to obtain a feature value of the $i^{th}$ feature point and feature values of the plurality of feature points adjacent to the $i^{th}$ feature point, to generate a local response score of the $i^{th}$ feature point based on the feature value of the $i^{th}$ feature point and the feature values of the plurality of feature points adjacent to the $i^{th}$ feature point, and to sequentially traverse the feature points on the feature map to obtain the local response scores of the feature points, in which i is a positive integer.

The generating module 620 includes: a second obtaining unit 622, configured to obtain channel response scores of the feature points on the feature map.

As a possible implementation, the second obtaining unit is configured to obtain a plurality, of feature values of the $i^{th}$ feature point on a plurality of channels, to generate a channel response score of the $i^{th}$ feature point based on the plurality of $i^{th}$ feature values of the feature point on the plurality of channels, and to sequentially traverse the feature points on the feature map to obtain the channel response scores of the feature points.

The generating module 620 also includes: a calculating unit 623, configured to calculate response scores of the feature points based on the local response scores and the channel response scores.

As a possible implementation, the calculating unit 623 is configured to calculate a response score of each feature point by multiplying a local response score of the feature point with a channel response score of the feature point.

The generating module 620 further includes: a generating unit 624, configured to generate the score response map of the image to be detected based on the response scores of the feature points.

Figure 10:
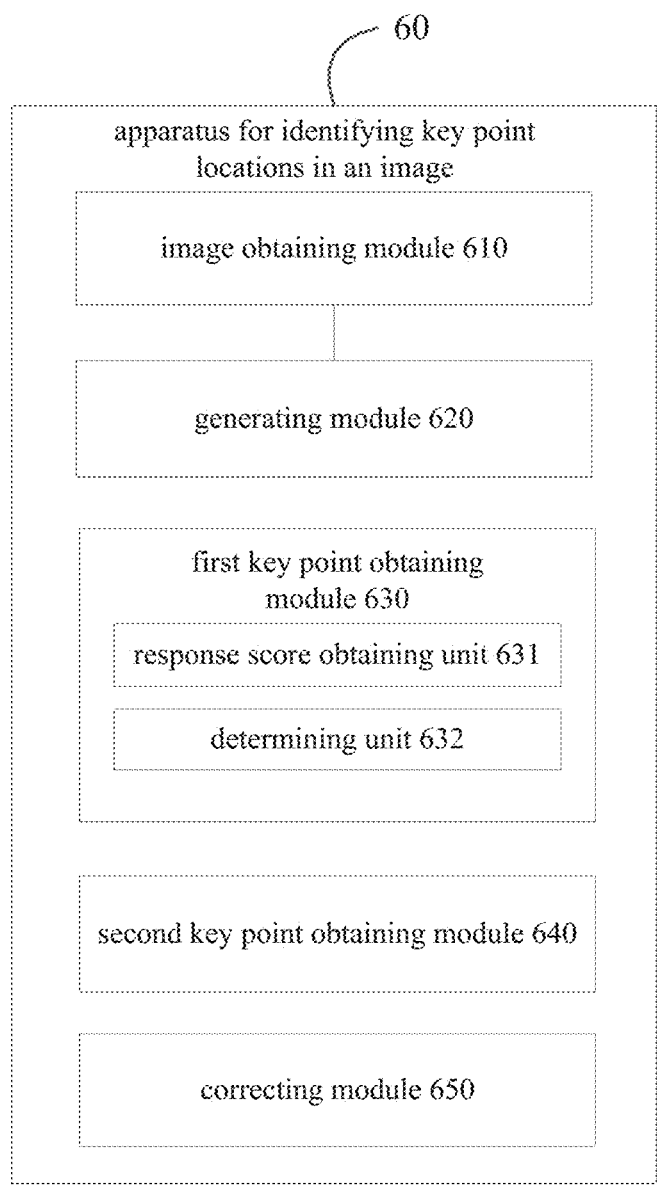
FIG. 10 is a schematic diagram of an apparatus for identifying key point locations in an image according to Embodiment 8 of the present disclosure.

In a possible implementation of the embodiments of the present disclosure, as illustrated in FIG. 10, on the basis of FIG. 8, the first key point obtaining module 630 includes: a response score obtaining unit 631, configured to obtain response scores of feature points on the score response map; and a determining unit 632, configured to determine a feature point with a response score greater than a preset threshold as the key point, and to obtain the first key point location of the key point.

Figure 11:
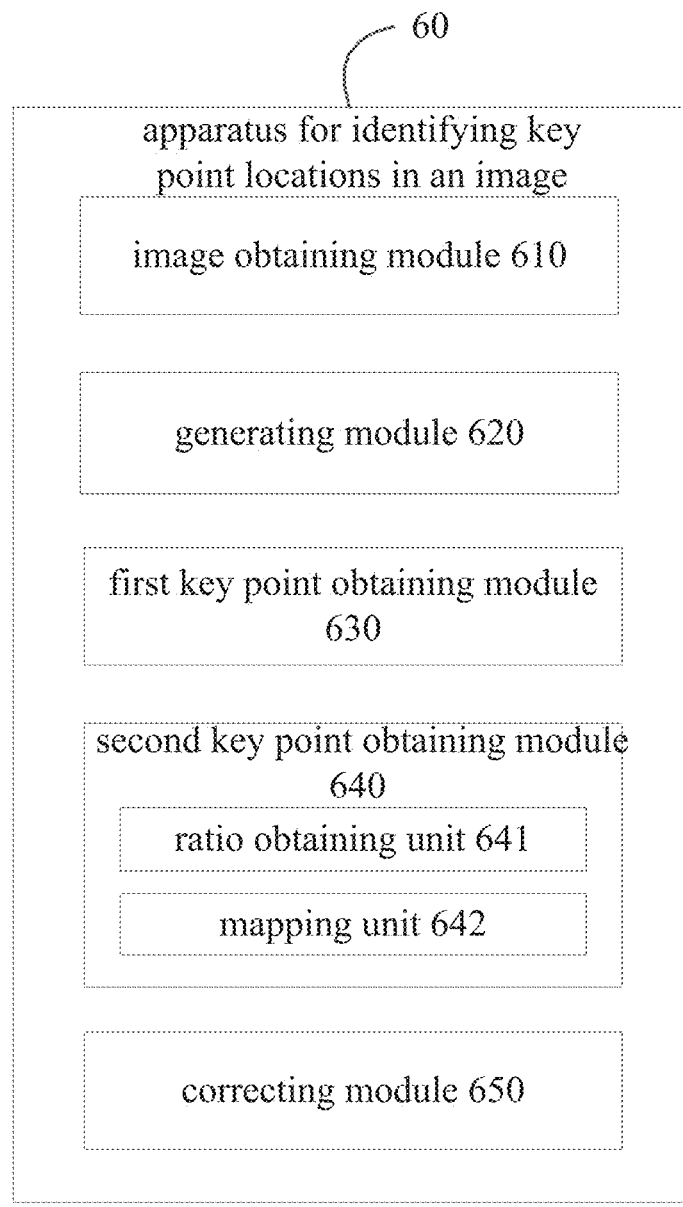
FIG. 11 is a schematic diagram of an apparatus for identifying key point locations in an image according to Embodiment 9 of the present disclosure.

In a possible implementation of the embodiments of the present disclosure, a resolution of the feature map is smaller than a resolution of the image to be detected. As illustrated in FIG. 11, on the basis of FIG. 8, the second key point obtaining module 640 includes: a ratio obtaining unit 641, configured to obtain a ratio of the resolution of the feature map to the resolution of the image to be detected; and a mapping unit 642, configured to generate the second key point location based on the ratio and the first key point location.

Figure 12:
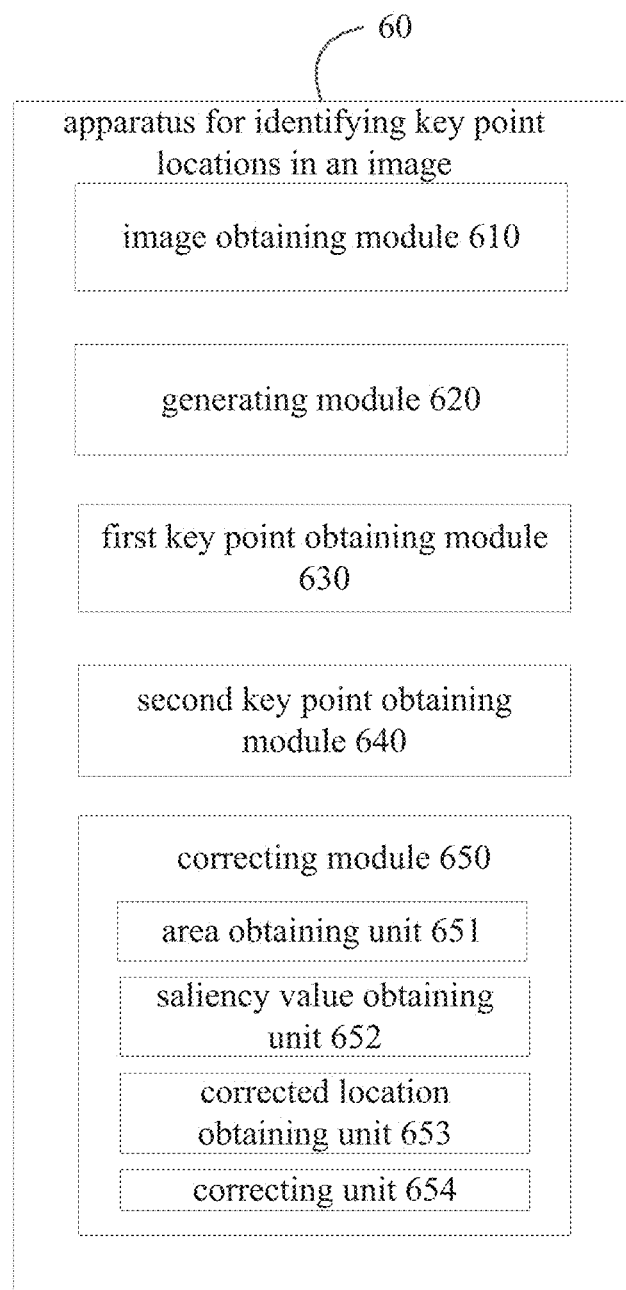
FIG. 12 is a schematic diagram of an apparatus for identifying key point locations in an image according to Embodiment 10 of the present disclosure.

In a possible implementation of the embodiments of the present disclosure, as illustrated in FIG. 12, on the basis of FIG. 8, the correcting module 650 includes: an area obtaining unit 651, a saliency value obtaining unit 652, a corrected location obtaining unit 653 and a correcting unit 654.

The area obtaining unit 651 is configured to obtain an area comprising the second key point location. The saliency value obtaining unit 652 is configured to obtain saliency values of feature points in the area. The corrected location obtaining unit 653 is configured to obtain a location of a feature point with the largest saliency value in the area, and to determine the location of the feature point with the largest saliency value in the area, as a corrected location. The correcting unit 654 is configured to correct the second key point location based on the corrected position.

It should be noted that the above explanation of the embodiment of the method for identifying key point locations in an image is also applicable to an apparatus for identifying key point locations in an image in this embodiment, the implementation principles are similar, which are not repeated here.

With the apparatus for identifying key point locations in an image, an image to be detected is obtained, a feature map and a saliency map of the image to be detected are also obtained. A score response map of the image to be detected is generated based on the feature map of the image to be detected. A first key point location of a key point on the score response map is obtained. A second key point location of the key point mapped on the image to be detected is obtained based on the first key point location, and the second key point location is corrected based on the saliency map. Therefore, by acquiring the saliency map corresponding to the image to be detected, the saliency map is used to correct the key point location determined according to the feature map, thereby avoiding the detect of fixing the center location of the local area on the image as the key point of the image, and ensuring that the revised key point location is more representative than the center position of the local area, so that the accuracy of key point selection is improved.

According to the embodiments of the present disclosure, the disclosure also provides an electronic device and a readable storage medium.

Figure 13:
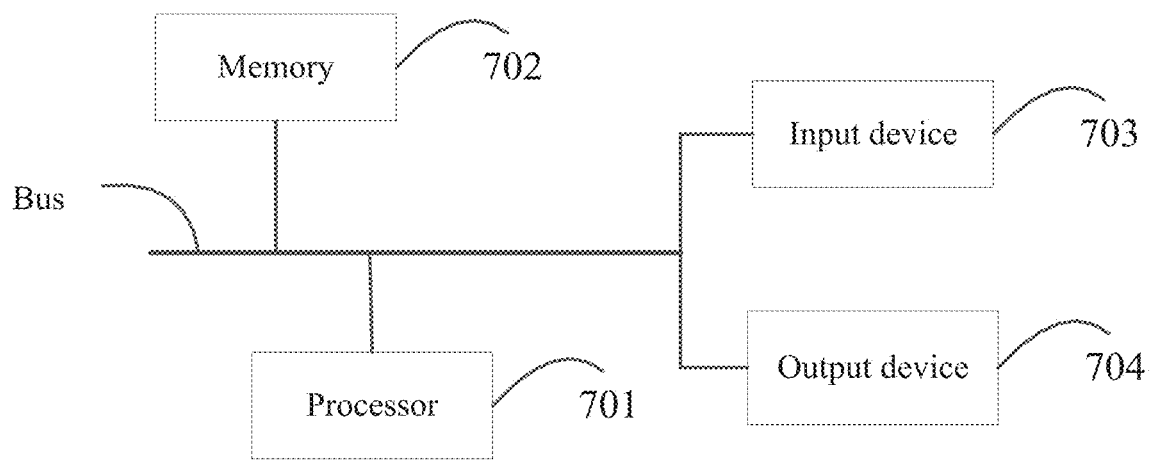
FIG. 13 is a block diagram of an electronic device used to implement the method for identifying key point locations in an image according to an embodiment of the present disclosure.

FIG. 13 is a block diagram of an electronic device used to implement the method for identifying key point locations in an image according to an embodiment of the present disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 13, the electronic device includes: one or more processors 701, a memory 702, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 701 is taken as an example in FIG. 13.

The memory 702 is a non-transitory computer-readable storage medium according to the disclosure. The memory stores instructions executable by at least one processor, so that the at least one processor executes the method according to the disclosure. The non-transitory computer-readable storage medium of the disclosure stores computer instructions, which are used to cause a computer to execute the method according to the disclosure.

As a non-transitory computer-readable storage medium, the memory 702 is configured to store non-transitory software programs, non-transitory computer executable programs and modules, such as program instructions/modules (for example, the image obtaining module 610, the generating module 620, the first key point obtaining module 630, the second key point obtaining module 640 and the correcting module 650 shown in FIG. 8) corresponding to the method in the embodiment of the present disclosure. The processor 701 executes various functional applications and data processing of the server by running non-transitory software programs, instructions, and modules stored in the memory 702, that is, implementing the method in the foregoing method embodiments.

The memory 702 may include a storage program area and a storage data area, where the storage program area may store an operating system and application programs required for at least one function. The storage data area may store data created according to the use of the electronic device for implementing the method. In addition, the memory 702 may include a high-speed random access memory, and a non-transitory memory, such as at least one magnetic disk storage device, a flash memory device, or other non-transitory solid-state storage device. In some embodiments, the memory 702 may optionally include a memory remotely disposed with respect to the processor 701, and these remote memories may be connected to the electronic device for implementing the method through a network. Examples of the above network include, but are not limited to, the Internet, an intranet, a local area network, a mobile communication network, and combinations thereof.

The electronic device for implementing the method may further include: an input device 703 and an output device 704. The processor 701, the memory 702, the input device 703, and the output device 704 may be connected through a bus or in other manners. In FIG. 13, the connection through the bus is taken as an example.

The input device 703 may receive inputted numeric or character information, and generate key signal inputs related to user settings and function control of an electronic device for implementing the method, such as a touch screen, a keypad, a mouse, a trackpad, a touchpad, an indication rod, one or more mouse buttons, trackballs, joysticks and other input devices. The output device 704 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, sound input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other.

According to the technical solution of the embodiments of this disclosure, by acquiring the saliency map corresponding to the image to be detected, the saliency map is used to correct the key point locations determined according to the feature map. Therefore, the defect of fixing the center position of the local area on the image as the key point of the image is avoided, and the corrected key point position is guaranteed to be more representative than the center position of the local area, and the accuracy of key point selection is improved.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the present disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

What is claimed is:

1. A method for identifying key point locations in an image, comprising:
obtaining an image to be detected, and obtaining a feature map and a saliency map of the image to be detected, wherein points on the saliency map reflect edge locations and detail locations of the image to be detected;
obtaining local response scores of feature points on the feature map;
obtaining channel response scores of the feature points on the feature map;

calculating response scores of the feature points based on the local response scores and the channel response scores;
generating a score response map of the image to be detected based on the response scores of the feature points;
obtaining a first key point location of a key point on the score response map;
obtaining a second key point location of the key point mapped on the image to be detected based on the first key point location; and
correcting the second key point location based on the saliency map.

2. The method according to claim 1, wherein obtaining the local response scores of the feature points on the feature map comprises:
obtaining a plurality of feature points adjacent to an $i^{th}$ feature point, i being a positive integer;
obtaining a feature value of the $i^{th}$ feature point and feature values of the plurality of feature points adjacent to the $i^{th}$ feature point; and
generating a local response score of the $i^{th}$ feature point based on the feature value of the $i^{th}$ feature point and the feature values of the plurality of feature points adjacent to the $i^{th}$ feature point, and sequentially traversing the feature points on the feature map to obtain the local response scores of the feature points.

3. The method according to claim 2, wherein obtaining the channel response scores of the feature points on the feature map comprises:
obtaining a plurality of feature values of the $i^{th}$ feature point on a plurality of channels;
generating a channel response score of the $i^{th}$ feature point based on the plurality of feature values of the $i^{th}$ feature point on the plurality of channels, and sequentially traversing the feature points on the feature map to obtain the channel response scores of the feature points.

4. The method according to claim 1, wherein calculating the response scores of the feature points based on the local response scores and the channel response scores, comprises:
calculating a response score of each feature point by multiplying a local response score of the feature point with a channel response score of the feature point.

5. The method according to claim 1, wherein obtaining the first key point location of the key point on the score response map comprises:
obtaining response scores of feature points on the score response map; and
determining a feature point with a response score greater than a preset threshold as the key point, and obtaining the first key point location of the key point.

6. The method according to claim 1, wherein a resolution of the feature map is smaller than a resolution of the image to be detected.

7. The method according to claim 6, wherein obtaining the second key point location of the key point mapped on the image to be detected based on the first key point location, comprises:
obtaining a ratio of the resolution of the feature map to the resolution of the image to be detected; and
generating the second key point location based on the ratio and the first key point location.

8. The method according to claim 1, wherein correcting the second key point location based on the saliency map comprises:
obtaining an area comprising the second key point location;
obtaining saliency values of feature points in the area;
obtaining a location of a feature point with the largest saliency value in the area, and
determining the location of the feature point with the largest saliency value in the area as a corrected location; and
correcting the second key point location based on the corrected position.

9. An apparatus for identifying key point locations in an image, comprising:
one or more processors;
a memory storing instructions executable by the one or more processors;
wherein the one or more processors are configured to:
obtain an image to be detected, and to obtain a feature map and a saliency map of the image to be detected, wherein points on the saliency map reflect edge locations and detail locations of the image to be detected;
obtain local response scores of feature points on the feature map;
obtain channel response scores of the feature points on the feature map;
calculate response scores of the feature points based on the local response scores and the channel response scores;
generate a score response map of the image to be detected based on the response scores of the feature points;
obtain a first key point location of a key point on the score response map;
obtain a second key point location of the key point mapped on the image to be detected based on the first key point location; and
correct the second key point location based on the saliency map.

10. The apparatus according to claim 9, wherein the one or more processors are configured to obtain a plurality of feature points adjacent to an $i^{th}$ feature point, to obtain a feature value of the $i^{th}$ feature point and feature values of the plurality of feature points adjacent to the $i^{th}$ feature point, to generate a local response score of the $i^{th}$ feature point based on the feature value of the $i^{th}$ feature point and the feature values of the plurality of feature points adjacent to the $i^{th}$ feature point, and to sequentially traverse the feature points on the feature map to obtain the local response scores of the feature points, in which i is a positive integer.

11. The apparatus according to claim 10, wherein the one or more processors are configured to obtain a plurality of feature values of the $i^{th}$ feature point on a plurality of channels, to generate a channel response score of the $i^{th}$ feature point based on the plurality of feature values of the $i^{th}$ feature point on the plurality of channels, and to sequentially traverse the feature points on the feature map to obtain the channel response scores of the feature points.

12. The apparatus according to claim 9, wherein the one or more processors are configured to calculate a response score of each feature point by multiplying a local response score of the feature point with a channel response score of the feature point.

13. The apparatus according to claim 9, wherein the one or more processors are configured to:
obtain response scores of feature points on the score response map; and
determine a feature point with a response score greater than a preset threshold as the key point, and to obtain the first key point location of the key point.

14. The apparatus according to claim 9, wherein a resolution of the feature map is smaller than a resolution of the image to be detected.

15. The apparatus according to claim 14, wherein the one or more processors are configured to:
obtain a ratio of the resolution of the feature map to the resolution of the image to be detected; and
generate the second key point location based on the ratio and the first key point location.

16. The apparatus according to claim 9, wherein the one or more processors are configured to:
obtain an area comprising the second key point location;
obtain saliency values of feature points in the area;
obtain a location of a feature point with the largest saliency value in the area, and to determine the location of the feature point with the largest saliency value in the area as a corrected location; and
correct the second key point location based on the corrected position.

17. A non-transitory computer-readable storage medium storing computer instructions, wherein the computer instructions are used to cause the computer to implement the method for identifying key point locations in an image, and the method comprise:
obtaining an image to be detected, and obtaining a feature map and a saliency map of the image to be detected, wherein points on the saliency map reflect edge locations and detail locations of the image to be detected;
obtaining local response scores of feature points on the feature map;
obtaining channel response scores of the feature points on the feature map;
calculating response scores of the feature points based on the local response scores and the channel response scores;
generating a score response map of the image to be detected based on the response scores of the feature points;
obtaining a first key point location of a key point on the score response map;
obtaining a second key point location of the key point mapped on the image to be detected based on the first key point location; and
correcting the second key point location based on the saliency map.

* * * * *